United States Patent
Wasson et al.

(10) Patent No.: US 7,217,226 B2
(45) Date of Patent: May 15, 2007

(54) METHOD AND SYSTEM FOR COUPLING A FLYWHEEL ASSEMBLY ONTO A SHAFT OF AN ELECTRIC MOTOR USING A SELF-HOLDING TAPER

(75) Inventors: Dewain L. Wasson, Hudson, WI (US); Vincent Hall, Elk Mound, WI (US)

(73) Assignee: McMillan Electric Company, Woodville, WI (US)

( * ) Notice: Subject to any disclaimer, the term of this patent is extended or adjusted under 35 U.S.C. 154(b) by 455 days.

(21) Appl. No.: 10/358,980

(22) Filed: Feb. 4, 2003

(65) Prior Publication Data
US 2004/0152565 A1 Aug. 5, 2004

(51) Int. Cl.
*A63B 22/02* (2006.01)
*H02K 9/06* (2006.01)

(52) U.S. Cl. ..................... 482/54; 416/60; 123/41.65; 310/153; 310/62

(58) Field of Classification Search .................. 482/54
See application file for complete search history.

(56) References Cited

U.S. PATENT DOCUMENTS

| | | |
|---|---|---|
| 141,018 A | 7/1873 | Sparks |
| 393,059 A | 11/1888 | Copeland |
| 430,270 A | 6/1890 | Cook |
| 1,102,116 A | 6/1914 | Wood |
| 1,314,005 A | 8/1919 | Louden |
| 2,071,953 A | 2/1937 | Schou |
| 2,228,770 A | 1/1941 | Tourneau |
| 2,318,051 A | 5/1943 | Brace |
| 2,932,447 A | 4/1960 | Phelon |
| 3,034,005 A | 5/1962 | Carr |

(Continued)

FOREIGN PATENT DOCUMENTS

AT 215531 6/1960

(Continued)

OTHER PUBLICATIONS

Photographs of a Flywheel Assembly, date unknown.

(Continued)

*Primary Examiner*—Stephen R. Crow
(74) *Attorney, Agent, or Firm*—Merchant & Gould PC

(57) ABSTRACT

An electric motor assembly including an electric motor and a flywheel assembly. The electric motor includes a rotatable shaft, at least a portion of the shaft being tapered as the shaft extends from the electric motor to an outer end of the shaft, the outer end of the shaft being threaded to receive a securing member. The flywheel assembly, which optionally includes a pulley and/or fan, includes a bore extending through a center of the flywheel assembly, at least a portion of the bore being tapered as the bore extends from an inner periphery facing the electric motor to the outer periphery of the flywheel assembly. The shaft of the electric motor extends through the bore of the flywheel assembly such that the taper of the shaft and the bore center the flywheel-pulley assembly on the shaft and create a self-holding taper arrangement. A securing member can be secured onto the outer end of the shaft to fix the flywheel assembly axially. Methods of forming and use are also provided.

6 Claims, 7 Drawing Sheets

U.S. PATENT DOCUMENTS

| | | |
|---|---|---|
| 3,307,423 A | 3/1967 | Dansi |
| 3,434,747 A | 3/1969 | Nichols |
| 3,662,619 A | 5/1972 | Seeliger |
| 3,838,301 A | 9/1974 | Moriyama |
| 3,906,266 A | 9/1975 | Cowman |
| 3,937,103 A | 2/1976 | Kleinhans |
| 3,947,710 A | 3/1976 | Miyamoto |
| 3,952,712 A | 4/1976 | Hermanson |
| 3,960,034 A | 6/1976 | Hintergraber |
| 4,262,552 A | 4/1981 | Honda |
| 4,569,114 A | 2/1986 | Ashcombe et al. |
| 4,668,116 A | 5/1987 | Ito |
| 4,785,687 A | 11/1988 | Luksch et al. |
| 4,886,392 A | 12/1989 | Iio |
| 4,980,592 A | 12/1990 | Olmar et al. |
| 4,993,865 A | 2/1991 | Nagashima |
| 5,033,903 A | 7/1991 | Olsson et al. |
| 5,070,268 A | 12/1991 | Phelon et al. |
| 5,158,390 A | 10/1992 | Ito et al. |
| 5,179,872 A * | 1/1993 | Pernice .................... 74/572.21 |
| 5,188,478 A * | 2/1993 | Bitsch et al. ............... 403/267 |
| 5,245,954 A | 9/1993 | Donohue |
| 5,447,479 A * | 9/1995 | Gvoich ....................... 482/54 |
| 5,476,430 A | 12/1995 | Lee et al. |
| 5,503,609 A | 4/1996 | Bull |
| 5,524,739 A | 6/1996 | Baier et al. |
| 5,558,604 A | 9/1996 | Hopkins |
| 5,735,669 A | 4/1998 | Niemela |
| 5,782,921 A * | 7/1998 | Colleran et al. ......... 623/20.15 |
| 6,137,199 A | 10/2000 | Lindsley |
| 6,695,581 B2 * | 2/2004 | Wasson et al. ................ 416/60 |

FOREIGN PATENT DOCUMENTS

| | | |
|---|---|---|
| JP | 37-13930 | 6/1937 |
| JP | 16-9764 (Y) | 7/1941 |
| JP | 55-153898 | 12/1980 |
| JP | 59-81835 | 6/1984 |
| JP | 59-174333 | 11/1984 |
| JP | 60-147722 | 10/1985 |
| JP | 61-205261 | 12/1986 |
| JP | 4-341638 | 11/1992 |
| JP | 5-49215 | 2/1993 |
| JP | 6-086519 | 3/1994 |
| JP | 8-281528 | 10/1996 |
| JP | 11-41890 | 2/1999 |

OTHER PUBLICATIONS

Cross-section of prior art McMillan 4600 Series Motor including auxiliary flywheel with tapered bore, date unknown.

Wasson et al., U.S. Appl. No. 10/029,110, filed Dec. 19, 2001, 23 pages.

* cited by examiner

METHOD AND SYSTEM FOR COUPLING A FLYWHEEL ASSEMBLY ONTO A SHAFT OF AN ELECTRIC MOTOR USING A SELF-HOLDING TAPER

TECHNICAL FIELD

This invention relates generally to an electric motor. More particularly, this invention relates to methods and systems for coupling a flywheel assembly to a shaft of an electric motor using a self-holding taper.

BACKGROUND

Flywheel assemblies are typically coupled to an armature shaft of an electric motor to maintain rotational speed of the motor by virtue of the inertia of the flywheel. In addition, combination assemblies, including a flywheel, a fan to cool the electric motor, and a pulley to transfer torque from the electric motor to other components, can be coupled to a shaft to perform these multiple functions.

There are currently several known methods for attaching a flywheel to a shaft of an electric motor. These methods include a slip fit arrangement, illustrated in FIG. 1, in which a bore of a flywheel 10 includes a threaded portion 11 and an end 20 of a shaft 21 of an electric motor 15 includes complementary threads. The flywheel 10 is coupled to the shaft 21 by screwing the flywheel onto the shaft. Another method is a keyed shaft arrangement, as shown in FIG. 2, in which a keyway 112 is cut through a hub 111 of the flywheel 110 and a complementary key 113 is provided in the shaft 120 of the electric motor 115 to hold the flywheel 110 in position relative to the shaft 120. A hole 114 for a set screw (not shown) can also be provided to secure the flywheel 110 to the shaft 120.

However, the current methods for coupling a flywheel to a shaft of an electric motor can be disadvantageous for several reasons. The methods require added coupling hardware such as bolts and set screws, or require keyways to be cut in the flywheel and the shaft, both adding to manufacturing time and cost. In addition, the methods rely on a slip fit between the flywheel and the shaft, which may result in the flywheel becoming unbalanced with respect to the shaft, resulting in higher noise and oscillations.

Accordingly, there is a need for a system for coupling a flywheel assembly to a shaft of an electric motor, the system being simple and reliable.

SUMMARY

This invention relates generally to an electric motor. More particularly, this invention relates to methods and systems for coupling a flywheel assembly to a shaft of an electric motor using a self-holding taper.

According to one aspect, the invention relates generally to an electric motor assembly including an electric motor having a shaft rotatably mounted about an axis of the electric motor and extending axially from the electric motor to transfer torque from the electric motor, at least a portion of the shaft being tapered as the shaft extends from the electric motor to an outer end of the shaft, the outer end of the shaft being configured to receive a securing member. The example electric motor assembly further includes a flywheel assembly, which may optionally include a pulley and/or fan, the flywheel assembly defining a bore extending axially through a center of the flywheel assembly, at least a portion of the bore being tapered as the bore extends axially from an inner periphery facing the electric motor to the outer periphery of the flywheel assembly. The shaft of the electric motor extends through the bore of the flywheel-pulley assembly such that the taper of the shaft and the bore center the flywheel-pulley assembly on the shaft and create a self-holding taper arrangement, and the securing member is secured onto the outer end of the shaft to hold the flywheel assembly axially.

According to another aspect, the invention generally relates to a method of coupling a flywheel assembly to a shaft of an electric motor, including: providing a flywheel assembly, optionally including a pulley and/or fan, the flywheel assembly defining a tapered bore; providing a tapered shaft of an electric motor, an end portion of the shaft including threads; pressing the tapered bore of the flywheel assembly onto the tapered shaft to create a self-holding taper arrangement; and threading a securing member onto the end portion of the shaft.

The above summary is not intended to describe each disclosed embodiment or every implementation of the present invention. Figures in the detailed description that follow more particularly exemplify embodiments of the invention. While certain embodiments will be illustrated and described, the invention is not limited to use in such embodiments.

BRIEF DESCRIPTION OF THE DRAWINGS

Aspects of the invention may be more completely understood in consideration of the following detailed description of various embodiments of the invention in connection with the accompanying drawings, in which.

While the invention is amenable to various modifications and alternative forms, specifics thereof have been shown by way of example and the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

This invention relates generally to an electric motor. More particularly, this invention relates to methods and systems for coupling a flywheel assembly to a shaft of an electric motor using a self-holding taper. While the present invention is not so limited, an appreciation of the various aspects of the invention will be gained through a discussion of the examples provided below.

An example system for coupling a flywheel onto a shaft of an electric motor generally includes an example flywheel assembly (the flywheel assembly optionally including a pulley and/or fan) with a tapered bore and an electric motor including a tapered shaft. The flywheel assembly is press-fit onto the shaft of the electric motor. The angle of the taper of the bore of the flywheel assembly and the angle of the taper of the shaft are preferably such that, when the flywheel assembly is press-fit onto the shaft, a self-holding taper arrangement is formed so that there is considerable resistance to any force tending to turn or rotate the flywheel relative to the shaft.

A self-holding taper (sometimes referred to as a "slow taper") is typically formed such that the taper is only 2 or 3 degrees. Standards for defining self-holding tapers include the American National, Morse, and Brown & Sharpe standards. As used herein, the term self-holding taper is defined as a taper with an angle small enough to hold a flywheel assembly in rotational alignment (i.e. radially) with respect to a shaft by friction. In one embodiment disclosed herein, a Morse No. 2 taper is used, although other taper sizes can also be used.

A self-holding taper contrasts with a self-releasing taper. Typically, a self-releasing taper has a much higher degree of taper (e.g., 30 degrees) and therefore does not exhibit the frictional fit created by a self-holding taper arrangement. Instead, a flywheel assembly including a bore with a self-releasing taper must be coupled to a shaft using holding means such as threads or keyways (see, e.g., FIGS. 1 and 2) to rotationally affix the flywheel assembly to the shaft.

Figure 3:
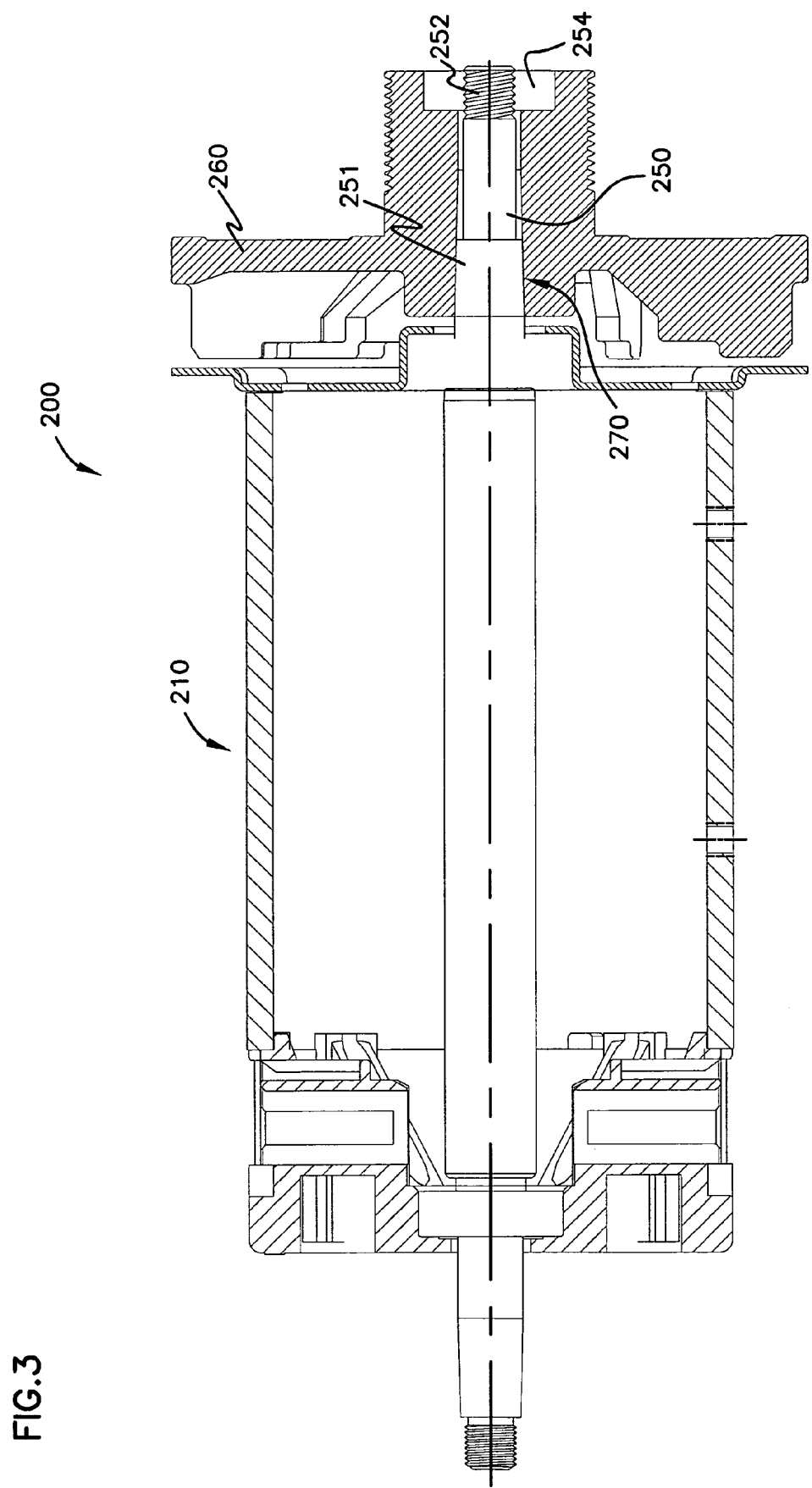
FIG. 3 is a cross-sectional view of an example electric motor assembly including an example flywheel assembly having a tapered bore press-fit onto an example tapered shaft of an electric motor.

Referring now to FIG. 3, a cross-section of an example electric motor assembly 200 is shown including an example electric motor 210 and an example flywheel assembly 260. The flywheel assembly 260, as illustrated, includes a flywheel (to maintain inertia), a pulley (to transfer torque), and a fan (to cool the motor). The flywheel 260 optionally includes a notch 254 defined in an outer periphery of the flywheel 260 opposite a side facing the electric motor 210 for receiving the securing member (described below). Other configurations for the flywheel assembly are possible. For example, the flywheel assembly can be formed to include only a pulley, or only a fan.

A shaft 250 of the electric motor 210 includes a tapered portion 251 that is inserted into a bore 270 of the flywheel assembly 260. The taper of the bore and the taper of the shaft function to center the flywheel assembly 260 on the shaft 250. In addition, because the taper of the shaft 250 and bore 270 are configured to create a self-holding taper arrangement, the flywheel assembly 260 is rotationally fixed to the tapered portion 251 of the shaft 250 by virtue of the frictional fit between the bore and the shaft. The shaft 250 can optionally include a threaded portion 252 at an end of the shaft 250 onto which a securing member (e.g., a nut, bolt, or other fastening member—not shown) is threaded to further seat and secure the flywheel assembly 260 in place axially.

Figure 4:
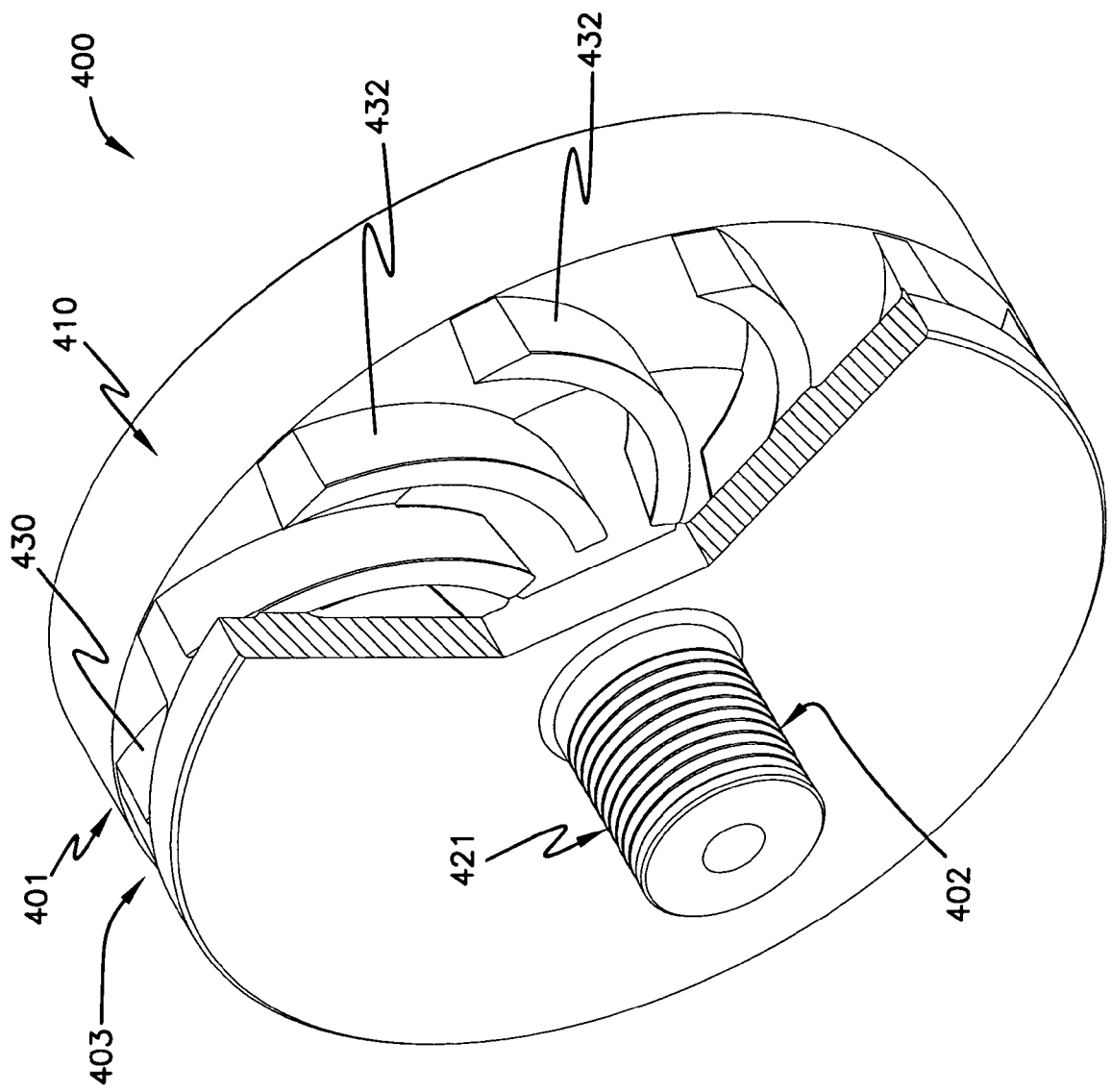
FIG. 4 is a perspective, partial cutaway view of an example fan-flywheel-pulley assembly.
Figure 5:
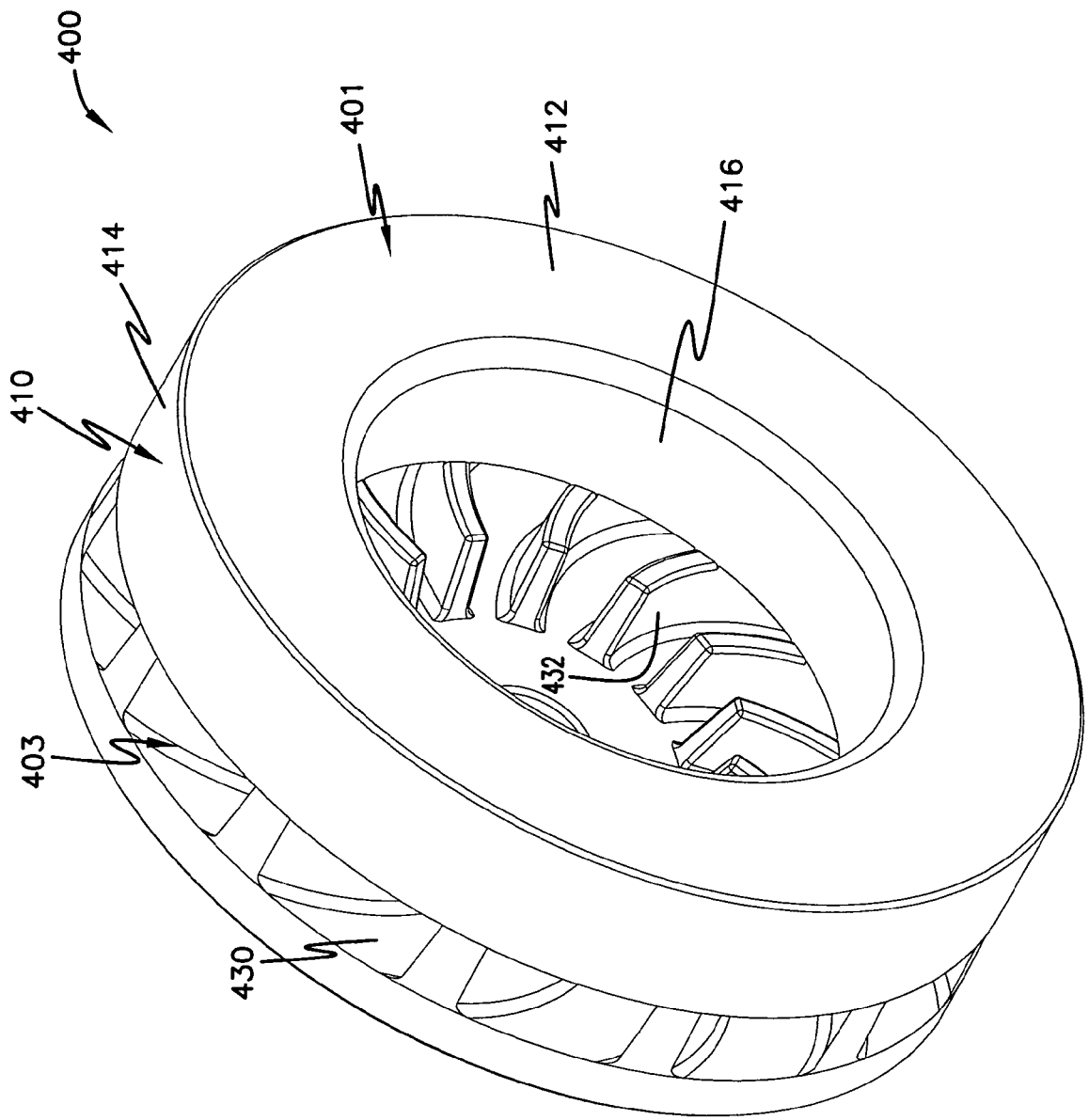
FIG. 5 is a perspective view of an opposite side of the fan-flywheel-pulley assembly of FIG. 4.
Figure 6:
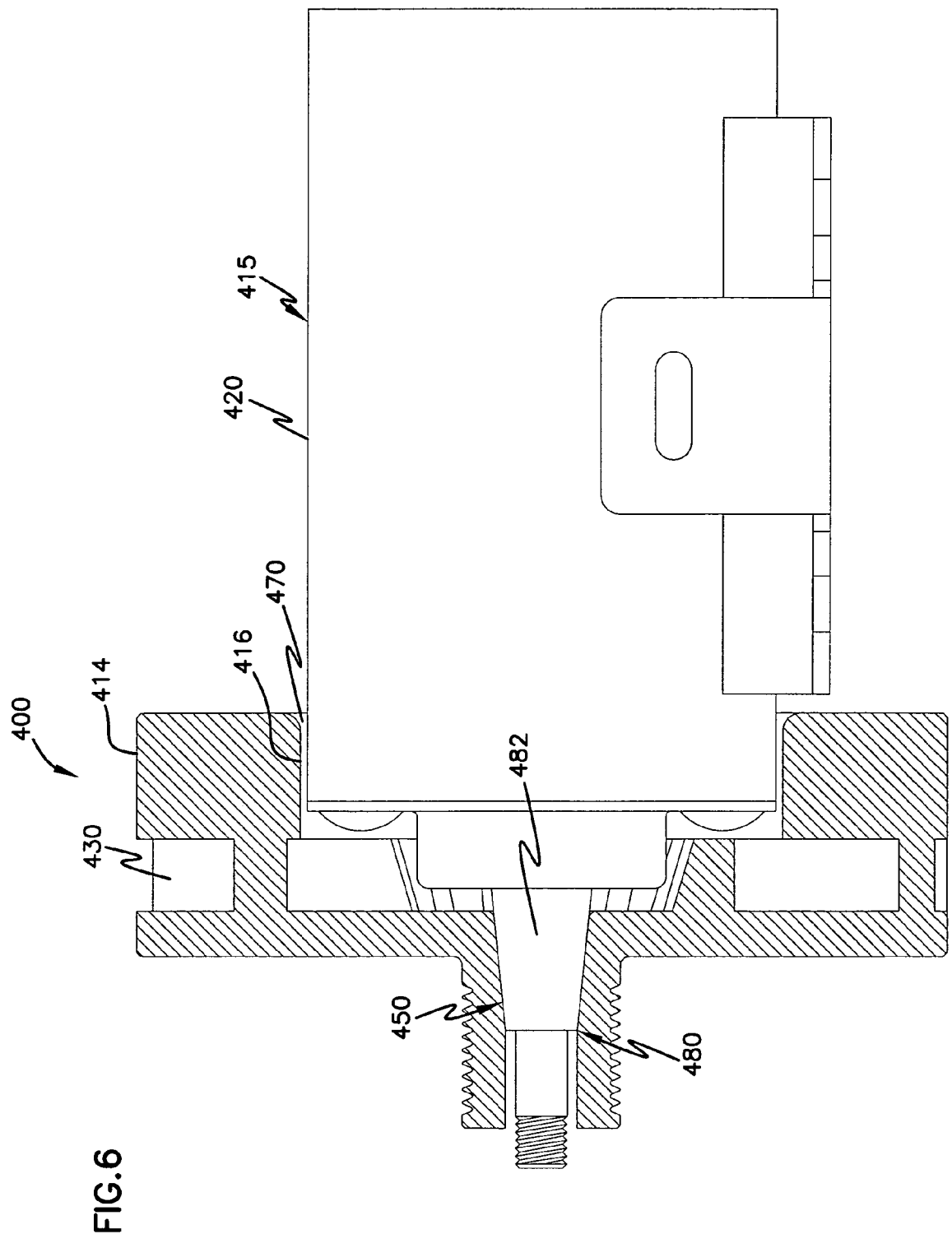
FIG. 6 is a cross-sectional view of another example electric motor assembly including the fan-flywheel-pulley assembly of FIG. 4 press-fit onto an example tapered shaft of an electric motor.

Referring now to FIGS. 4–6, an alternative embodiment is shown. In FIGS. 4 and 5, an example fan-flywheel-pulley assembly 400 is shown. In the example shown, the fan-flywheel-pulley assembly 400 is identical to that disclosed in U.S. patent application Ser. No. 10/029,110, filed Dec. 19, 2001 and entitled "COMBINATION FAN-FLYWHEEL-PULLEY ASSEMBLY AND METHOD OF FORMING," the entirety of which is hereby incorporated by reference.

The fan-flywheel-pulley assembly 400 generally includes a fan 403, a flywheel 401, and a pulley 402. The pulley 402 includes an outer pulley surface 421 onto which a belt or other device can be attached to transfer torque from an electric motor 415 (see FIG. 6) to another device such as, for example, a roller of a treadmill (see, e.g., FIG. 7). The flywheel 401 includes an outer flywheel surface 410 and a baffle portion 412 with an outer baffle surface 414 and an inner baffle surface 416. The outer flywheel surface 410 partially defines, along with a portion of the fan 403, a plurality of openings 430 circumferentially spaced along the outer flywheel surface 410. Blades 432 of the fan 403 are preferably curved, but may also be straight. The fan 403 is preferably a radial, or centrifugal fan, as opposed to an axial fan.

Referring to FIG. 6, the inner baffle diameter is selected so that the inner baffle surface 410 extends in close proximity to a housing 420 of the electric motor 415. A gap 470 formed between the inner baffle surface 416 and the housing 420 is generally small and is preferably equal to or less than ¼ inch, although other gap sizes are also possible. In this configuration, the inner baffle surface 416 is in close proximity to the housing 420 to reduce any leakage of air through gap 470. The baffle portion 414 of the flywheel 401 extending over the motor 415 also provides additional inertia. In this manner, the assembly 400 is designed with a greater mass and therefore greater inertia, while still minimizing the profile, or outer diameter, of the assembly 400.

The fan-flywheel-pulley assembly 400 includes a tapered bore 480 that is coupled to the shaft 450 of the electric motor 415, which also includes a tapered portion 482 to create a self-holding taper arrangement between the fan-flywheel-pulley assembly 400 and the shaft 450 of the electric motor 415.

Figure 7:
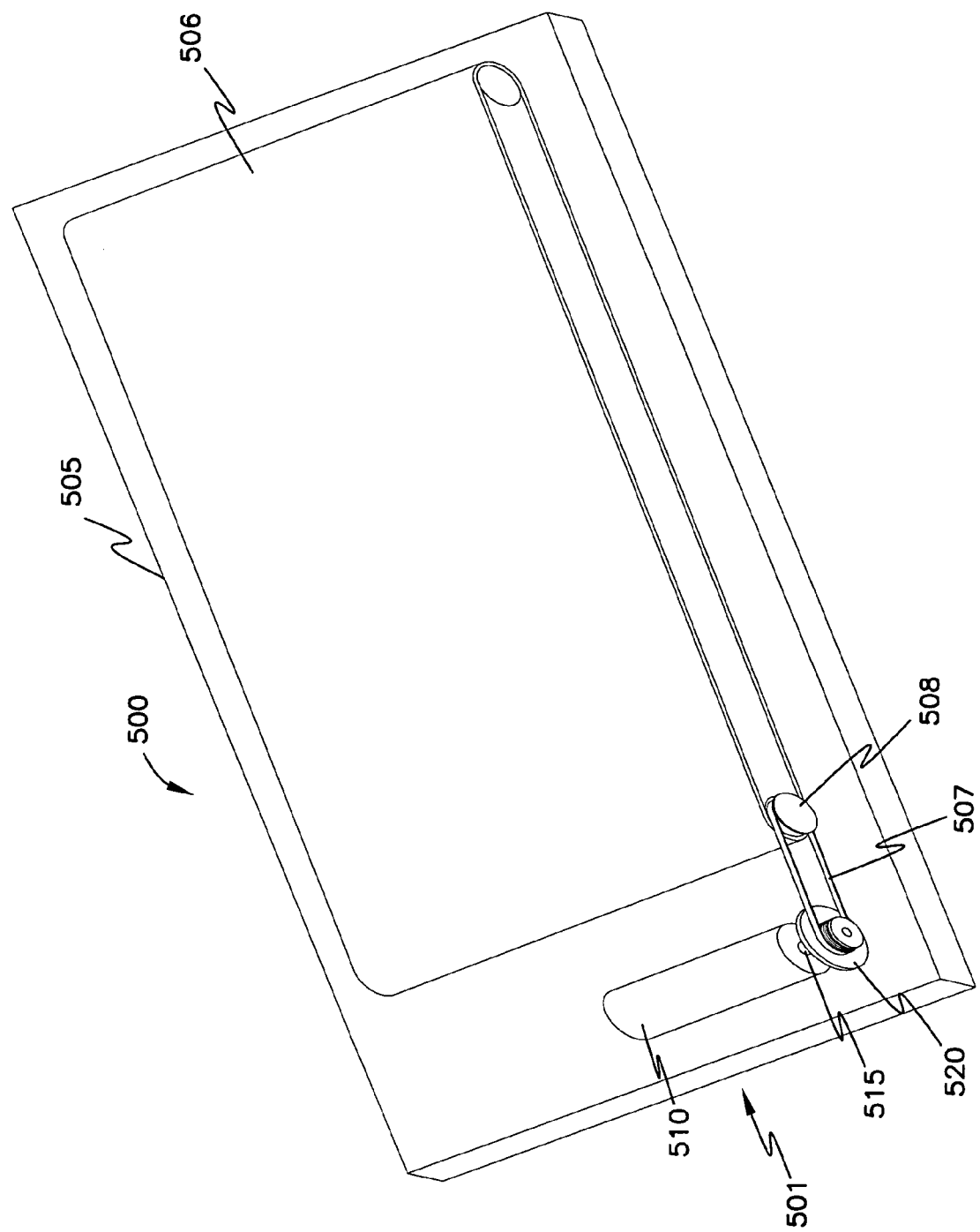
FIG. 7 is a perspective view of part of an example treadmill with an upper cover removed to show an example flywheel assembly having a tapered bore press-fit onto an example tapered shaft of an electric motor of the treadmill.

Referring now to FIG. 7, a portion of an example treadmill 500 is illustrated, including an example electric motor assembly 501. The treadmill 500 generally includes a frame 505 and a treadmill belt 506 on which an individual can walk or run. The treadmill belt 506 is driven by a drive roller 508 that is, in turn, coupled by a drive belt 507 to a pulley of a flywheel assembly 520. The flywheel assembly 520 includes a tapered bore that is press fit onto a tapered shaft 515 of the electric motor 510 to create a self-holding taper arrangement. In this arrangement, torque from the electric motor 510 is transferred radially from the flywheel assembly 520 to the drive belt 508 of the treadmill 500 by the drive belt 507.

An example method for assembling an electric motor assembly is as follows. The flywheel assembly with the tapered bore is pressed onto the tapered shaft of an electric motor. Preferably, the flywheel assembly is pressed until frictionally engaged on the shaft to create the desired self-holding arrangement. In some embodiments, a small amount of material of either or both of the flywheel assembly and the shaft is actually displaced as the flywheel assembly is pressed onto the shaft. In one embodiment disclosed herein, approximately 700 pounds is applied to press the flywheel assembly onto the shaft. Because of the tapered surfaces, the flywheel assembly is automatically centered as it is pressed onto the shaft.

Once the flywheel assembly has been pressed onto the shaft, a securing member is threaded onto the protruding end of the shaft to secure the flywheel assembly axially on the shaft. In the illustrated embodiment wherein the securing member is a locking nut, 20 ft-lbs of nut torque is applied for a locking nut, 10 ft-lbs for a non-locking nut. Because of the self-holding taper arrangement between the flywheel assembly and the shaft, the flywheel assembly can be rotationally secured to prevent undesired rotation of the shaft during threading of the securing member onto the shaft.

The use of self-holding tapers to couple flywheels disclosed herein to an electric motor can be advantageous for several reasons. For example, the self-holding arrangement provides a reliable coupling between the flywheel assembly and the shaft of the electric motor without requiring a key or other components to rotationally fix the flywheel assembly with respect to the shaft. In addition, because of the taper in the shaft of the electric motor, it is possible to minimize the size of the shaft as it passes through the bearings of the electric motor, while maximizing the size of the securing member used to secure the flywheel assembly onto the shaft.

Figure 1:
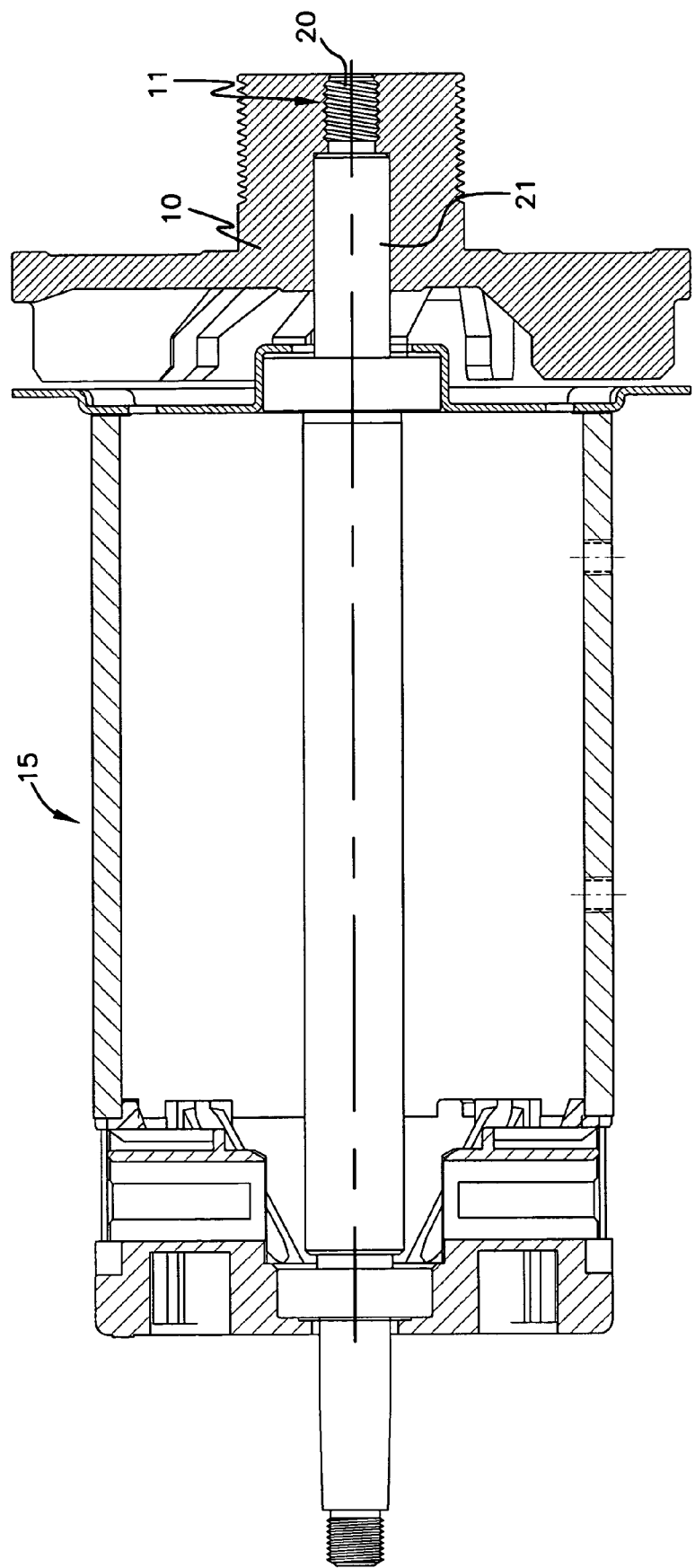
FIG. 1 is a cross-sectional view of a flywheel threaded onto a shaft of an electric motor.
Figure 2:
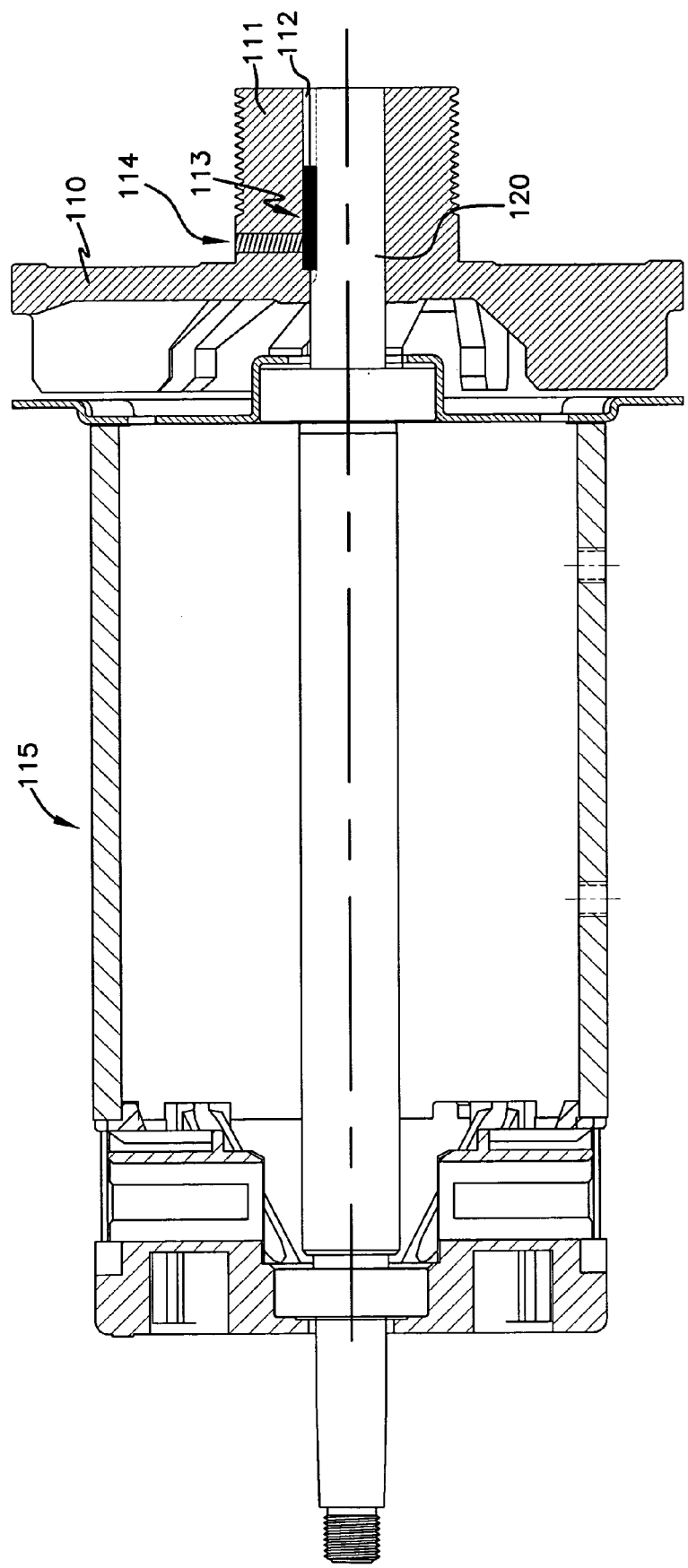
FIG. 2 is a cross-sectional view of a flywheel including a keyway mounted onto a keyed shaft of an electric motor.

Further, the use of the tapered shaft centers the flywheel onto the shaft while minimizing any give between the bore and the shaft that is associated with other configurations, such as the threaded configuration shown in FIG. 1 and the keyed configuration shown in FIG. 2. This reduces noise and oscillations associated with flywheels that are not as precisely centered with respect to the shaft and reduces costs associated with balancing flywheels including, for example, keys. Also, as described above, the self-holding taper creates an interference fit which functions to hold the flywheel radially with respect to the shaft.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electric motor assembly, comprising:
   an electric motor including a shaft rotatably mounted about an axis of the electric motor and extending axially from the electric motor to transfer torque from the electric motor, at least a portion of the shaft being tapered as the shaft extends from the electric motor to an outer end of the shaft, the outer end of the shaft being configured to receive a securing member, and
   a flywheel assembly defining a bore extending axially through a center of the flywheel assembly, at least a portion of the bore being tapered as the bore extends axially from an inner periphery facing the electric motor to the outer periphery of the flywheel assembly, wherein the flywheel assembly includes a flywheel, a radial fan with a plurality of radial blades, and a pulley;
   wherein tie shaft of the electric motor extends through the bore of the flywheel assembly such that the taper of the shaft and the bore center the flywheel assembly on the shaft and create a self-holding taper arrangement, and wherein the securing member is secured onto the outer end of the shaft.

2. The electric motor assembly of claim 1, wherein the flywheel assembly defines a notch in an outer periphery of the flywheel assembly facing opposite the electric motor, and wherein the securing member is received in the notch in the outer periphery of the flywheel assembly.

3. The electric motor assembly of claim 1, wherein a portion the flywheel extends circumferentially about a housing of the electric motor from an inner diameter to an outer diameter, wherein the portion of the flywheel creates a baffle positioned in close proximity to the housing to limit a gap between the baffle and the housing.

4. The electric motor assembly of claim 3, wherein the flywheel includes an outer circumferential flywheel surface at least partially defining a plurality of circumferentially spaced openings, and wherein the radial fan is disposed within the flywheel and positioned about the axis so that each of the plurality of openings are positioned between each adjacent blade of the plurality of radial blades.

5. An electric motor assembly configured for a treadmill, comprising:
   an electric motor including a shaft rotatably mounted with respect to and extending axially horn the electric motor to transfer torque from the electric motor, at least a portion of the shaft being tapered as the shaft extends from the electric motor to an outer end of the shaft, and the electric motor including a housing enclosing the electric motor; and
   a fan-flywheel-pulley assembly including a pulley positioned about a central axis of the fan-flywheel-pulley assembly, a flywheel coupled to the pulley and positioned about the central axis, the flywheel including an outer circumferential flywheel surface at least partially defining a plurality of circumferentially spaced openings, and wherein a portion of the flywheel extends circumferentially about the housing of the electric motor from an inner diameter to an outer diameter, wherein the portion of the flywheel creates a baffle positioned in close proximity to the housing to limit a gap between the baffle and the housing, and a radial fan disposed within the flywheel and positioned about the central axis including a plurality of blades, wherein each of the plurality of openings are positioned between each adjacent blade of the plurality of blades, wherein the pulley, the flywheel, and the radial fan are integrally formed, and wherein the fan-flywheel-pulley assembly defines a bore extending axially through the central axis of the fan-flywheel-pulley assembly, at least a portion of the bore being tapered as the bore extends axially from an inner periphery facing the electric motor to the outer periphery of the fan-flywheel-pulley assembly;
   wherein the shaft of the electric motor extends through the bore of the fan-flywheel-pulley assembly such that the taper of the shaft and the bore center the fan-flywheel-pulley assembly on the shaft and create a self-holding taper arrangement.

6. The electric motor assembly of claim 5, wherein the outer end of the shaft is threaded to receive a securing member, and the fan-flywheel-pulley assembly defines a notch in an outer periphery of the fan-flywheel-pulley assembly facing opposite the electric motor, and wherein the securing member is threaded onto the shaft and is received in the notch in the outer periphery of the fan-flywheel-pulley assembly.

* * * * *

UNITED STATES PATENT AND TRADEMARK OFFICE
CERTIFICATE OF CORRECTION

PATENT NO. : 7,217,226 B2  
APPLICATION NO. : 10/358980  
DATED : May 15, 2007  
INVENTOR(S) : Wasson et al.

Page 1 of 1

It is certified that error appears in the above-identified patent and that said Letters Patent is hereby corrected as shown below:

Col. 5, line 48, claim 1: "wherein tie shaft" should read --wherein the shaft--

Col. 5, line 60, claim 3: "portion the flywheel" should read --portion of the flywheel--

Col. 6, line 15, claim 5: "axially horn the" should read --axially from the--

Signed and Sealed this

Second Day of October, 2007

JON W. DUDAS  
*Director of the United States Patent and Trademark Office*